United States Patent
Edwards et al.

(10) Patent No.: US 7,181,496 B1
(45) Date of Patent: Feb. 20, 2007

(54) AUTOMATIC EMAIL FORWARDING RULE CREATION

(75) Inventors: Eric Jeffrey Edwards, Surrey (CA); David Rowley, Burnaby (CA)

(73) Assignee: Infowave Software Inc., Burnaby (CA)

( * ) Notice: Subject to any disclaimer, the term of this patent is extended or adjusted under 35 U.S.C. 154(b) by 613 days.

(21) Appl. No.: 10/113,390

(22) Filed: Mar. 29, 2002

(51) Int. Cl.
    *G06F 15/16* (2006.01)
(52) U.S. Cl. .................. 709/206; 709/224; 709/223
(58) Field of Classification Search ............. 709/206, 709/217, 223–224
    See application file for complete search history.

(56) References Cited

U.S. PATENT DOCUMENTS

| | | | |
|---|---|---|---|
| 5,917,489 A * | 6/1999 | Thurlow et al. ............. | 709/206 |
| 6,047,310 A * | 4/2000 | Kamakura et al. ........... | 709/206 |
| 6,427,164 B1 * | 7/2002 | Reilly ........................ | 709/206 |
| 6,654,787 B1 * | 11/2003 | Aronson et al. ............ | 709/206 |
| 6,691,156 B1 * | 2/2004 | Drummond et al. ........ | 709/206 |
| 6,721,785 B1 * | 4/2004 | Raghunandan .............. | 709/206 |
| 6,832,246 B1 * | 12/2004 | Quine ........................ | 709/207 |
| 6,868,498 B1 * | 3/2005 | Katsikas ..................... | 709/217 |
| 2001/0049745 A1 * | 12/2001 | Schoeffler .................... | 709/206 |
| 2001/0051991 A1 | 12/2001 | Beyda et al. | |
| 2002/0129111 A1 * | 9/2002 | Cooper ....................... | 709/207 |
| 2002/0138581 A1 * | 9/2002 | MacIntosh et al. ......... | 709/206 |
| 2003/0014490 A1 | 1/2003 | Bates et al. | |
| 2003/0097412 A1 * | 5/2003 | Chow ......................... | 709/206 |
| 2003/0115280 A1 * | 6/2003 | Quine et al. ................ | 709/207 |
| 2004/0073619 A1 | 4/2004 | Gilhuly et al. | |

* cited by examiner

*Primary Examiner*—Philip B. Tran
(74) *Attorney, Agent, or Firm*—Rathe Patent & IP Law

(57) ABSTRACT

A system and method automatically creates message forwarding rules. The method can include receiving a message having at least one recipient and, for each of the at least one recipient, determining whether a rule exists including the recipient; if a blocking rule exists for the recipient, deleting the blocking rule and creating an active forwarding rule for the recipient; and, if no rule exists for the recipient, creating an active forwarding rule for the recipient.

20 Claims, 3 Drawing Sheets

AUTOMATIC EMAIL FORWARDING RULE CREATION

FIELD OF THE INVENTION

The present invention relates generally to computer communication methods and systems. Further, an exemplary embodiment of the present invention relates to automatic email forwarding rule creation.

BACKGROUND OF THE INVENTION

Electronic messages or "e-mail" can be communicated in a variety of different ways to and from different computing devices. In general, an e-mail includes a sender address and one or more recipient addresses as well as a message. Some e-mails can also include an attached computer-readable file. Some e-mail computer programs designate fields, such as, "to" fields, "cc" fields, or "bcc" fields in which the sender can include one or more recipient addresses.

One difficulty for people communicating with e-mail is that, in general, e-mail can only be accessed at the address to which it is sent. Such an e-mail address can often only be accessed from a desktop computer connected to a communication network, such as a local area network (LAN) or the Internet, or a laptop computer accessing a network in some fashion. Some people attempt to solve the problem of increased access to e-mail using e-mail forwarding. E-mail forwarding allows a person to configure their e-mail system to forward some or all e-mails to a different address, location, or device.

While e-mail forwarding provides some flexibility for e-mail users, there are still disadvantages. One of the disadvantages to e-mail forwarding is particularly apparent when the e-mail is forwarded to another computer or device, such as a handheld computing device, having a different address. Once the e-mail is forwarded to a device having a different address, a reply e-mail from the device having a different address includes the different address. Multiple addresses from the same sender can confuse an e-mail recipient to whom e-mails are sent, making it difficult to know what address is the correct one. Further, multiple addresses can make the organization of e-mails (both sent and received) very cumbersome.

Some of the drawbacks of e-mail forwarding are resolved by the use of redirector programs. For example, the INFO-WAVE EXCHANGE CONNECTOR computer software program sold by INFOWAVE SOFTWARE of Burnaby, British Columbia, Canada, includes an e-mail redirector that "re-directs" or communicates e-mails sent to one e-mail address to another device without adversely affecting the e-mail addresses (e.g., to or from addresses). Redirector programs enable the communication of return e-mails from the remote device in a manner that the final recipient is unaware that messages are redirected to a different device. That is, the sending e-mail address is the same whether the e-mail is sent from a remote device through a redirector program on a computer or the e-mail is sent directly from the computer.

In both e-mail forwarding and e-mail redirection systems, the user can establish rules naming addresses that should be forwarded (or redirected) and rules naming addresses that should not be forwarded (or redirected). Nevertheless, conventional systems require that the user must enter these various forwarding or blocking rules. As such, it is possible, using conventional e-mail forwarding or redirection systems, for a user to send an e-mail to a recipient but not be able to receive the recipient's response because the user has not taken the time and effort to create a forwarding rule including that recipient.

By way of another example, a user sending an e-mail from a personal digital assistant (PDA) using a conventional redirection program must return to the redirector program located on another computer and establish a forwarding rule or change a blocking rule to ensure receipt of a return e-mail.

Thus, there is a need to automatically add e-mail forwarding rules. Further, there is a need to ensure that replies to messages sent to a recipient will be received by the sender because the recipient addresses are automatically added to the sender's forwarding rules. Even further, there is a need for ensuring that subsequent replies from any person or group a user sends a message to will be received.

The teachings hereinbelow extend to those embodiments which fall within the scope of the appended claims, regardless of whether they accomplish one or more of the above-mentioned needs.

SUMMARY OF THE INVENTION

An exemplary embodiment relates to a method of automatically creating message forwarding rules. The method includes receiving a message having at least one recipient and, for each of the at least one recipient, determining whether a rule exists including the recipient; if a blocking rule exists for the recipient, deleting the blocking rule and creating an active forwarding rule for the recipient; and, if no rule exists for the recipient, creating an active forwarding rule for the recipient.

Another exemplary embodiment relates to a system for automatically creating electronic mail forwarding rules for an electronic mail redirection program based on recipient addresses in electronic mail messages sent from a client device to a redirector. The system includes a central processing unit (CPU) and a storage device coupled to the CPU. The storage device stores information for configuring the CPU to receive an electronic message from the client device where the electronic message has at least one recipient address. Further, the CPU can be configured, for each recipient address, (1) to determine whether a rule exists including the recipient address, (2) to delete a blocking rule and create a forwarding rule for the recipient address if a blocking rule exists for the recipient address, and (3) to create a forwarding rule for the recipient address if no rule exists for the recipient address.

Another exemplary embodiment relates to a system for automatically creating electronic mail forwarding rules. The system includes means for receiving an electronic mail message having at least one recipient, means for determining whether a rule exists including the recipient for each of the at least one recipient, means for deleting a blocking rule and creating an active forwarding rule for the recipient if a blocking rule exists for the recipient, and means for creating an active forwarding rule for the recipient if no rule exists for the recipient.

Other features and advantages of embodiments of the present invention will become apparent to those skilled in the art upon review of the following drawings, the detailed description, and the appended claims.

BRIEF DESCRIPTION OF THE DRAWINGS

The invention is illustrated by way of example and not limitation using the FIGURES of the accompanying drawings, in which like references indicate similar elements and in which.

DETAILED DESCRIPTION OF THE EXEMPLARY EMBODIMENTS

Exemplary systems and methods of automatically creating electronic mail forwarding rules are described herein. In the following description, for purposes of explanation, numerous specific details are set forth to provide a thorough understanding of exemplary embodiments of the invention. It will be evident, however, to one skilled in the art that the invention may be practiced without these specific details. In other instances, structures and devices are shown in diagram form to facilitate description of the exemplary embodiments.

In at least one embodiment, a computer system is used which has a processing unit or central processing unit (CPU) that executes sequences of instructions contained in a memory. More specifically, execution of the sequences of instructions causes the CPU to perform steps, which are described below. The instructions may be loaded into a random access memory (RAM) for execution by the CPU from a read-only memory (ROM), a mass storage device, or some other persistent storage. In other embodiments, hard-wired circuitry may be used in place of, or in combination with, software instructions to implement the functions described. Thus, the embodiments described herein are not limited to any specific combination of hardware circuitry and software, nor to any particular source for the instructions executed by the computer system.

Figure 1:
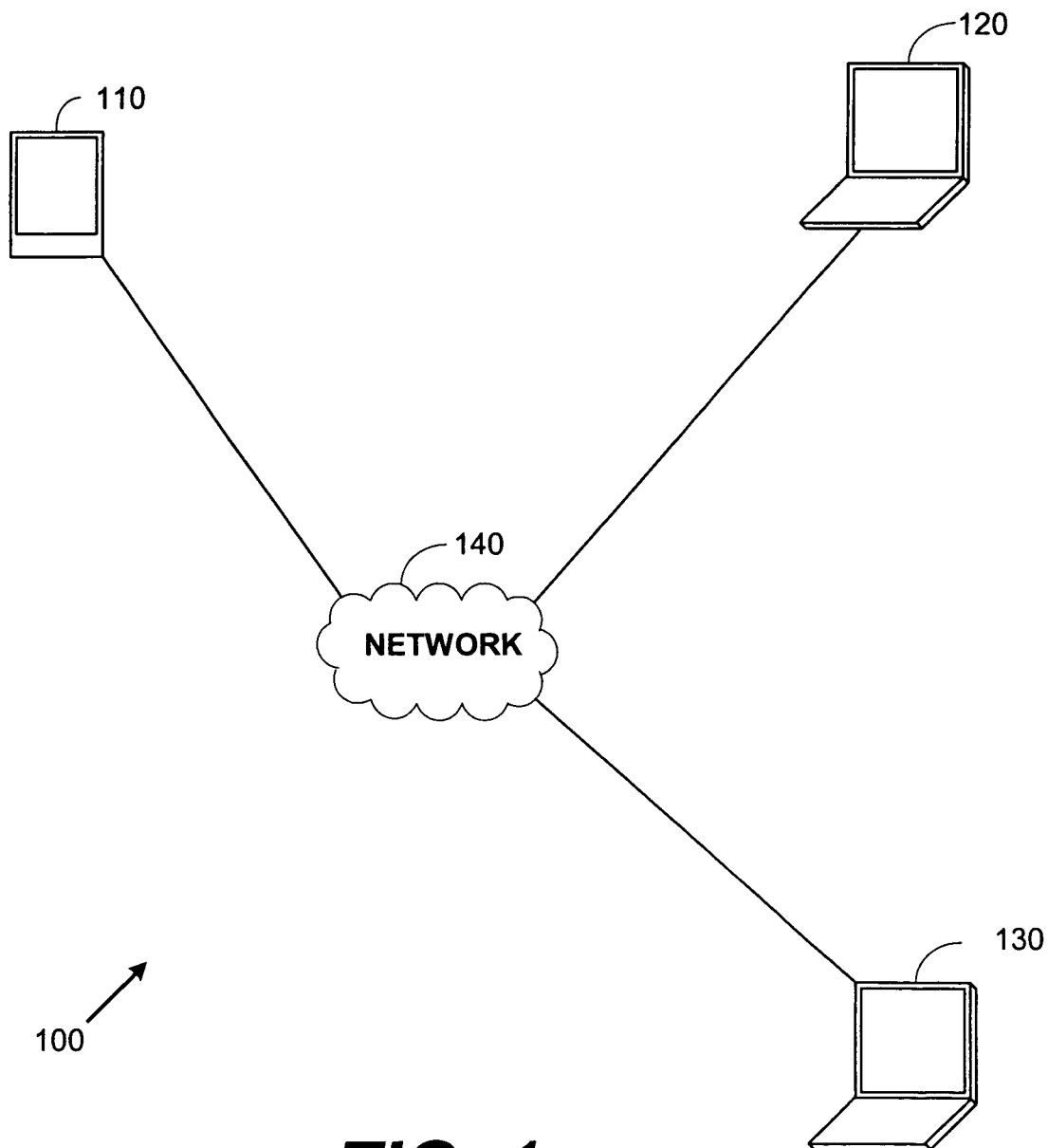
FIG. 1 is a is a general block diagram of a system for automatically creating electronic mail forwarding rules in accordance with an exemplary embodiment.

FIG. 1 illustrates a system 100 including a computing device 110, a computer 120, a computer 130, and a network 140. Computing device 110 is capable of communicating with computer 120 via network 140. Computing device 110 can be a wireless cellular digital phone (e.g., a WAP phone), a handheld personal digital assistant, a two-way text messaging device (e.g., two-way pager), a laptop computer, a handheld computer, a desktop computer, or any other device configured for communication over network 140.

Computer 120 can be a desktop or laptop computer, computer server, or any other device capable of storing information and coupled at least temporarily to a network for communication with computing device 110. Computer 130 can also be a desktop or laptop computer, computer server, or any other device capable of storing information and coupled at least temporarily to a network. Computer 120 or computer 130 can run any commercially available e-mail program, such as the EXCHANGE e-mail program sold by Microsoft Corporation of Redmond, Wash., U.S.A.

Network 140 can be any type of network, such as a virtual private network (VPN), the Internet, an ethernet, a Netware network, a global systems for mobile communication (GSM) network, or messaging network. Network 140 can use a protocol, such as the TCP/IP network protocol or the DECnet, X.25, or UDP protocols. Further, network 140 can include a configuration, such as a wireless network, a wide area network (WAN), or a local area network (LAN). Network 140 can provide communication with Hypertext Markup Language (HTML) web pages.

In an exemplary embodiment, computer 120 receives an electronic message or e-mail from computer 130 via network 140. For purposes of description, "e-mail" can refer to any type of electronic message including, but not limited to, instant messages or any other type of communication. Further, while exemplary embodiments described herein refer generally to electronic messages, the systems and methods described with reference to the FIGURES can also apply to voice messages and telephone calls. For example, voice messages and phone calls can be forwarded from one device to another using forwarding and blocking rules.

Computer 120 receives an e-mail from computer 130 and checks for a rule including the sender address of the e-mail. Rules, such as forwarding and blocking rules, can be stored in memory of computer 120. Such memory storage can be in random access memory (RAM) or read only memory (ROM) devices. If the sender email address is included in a forwarding rule, the e-mail is forwarded or redirected from computer 120 to computing device 110. If the sender email address is included in a blocking rule, the e-mail is not forwarded or redirected to computing device 110.

An e-mail can be composed at computing device 110, including a recipient address. Computing device 110 communicates the e-mail to computer 120 and the e-mail is communicated to recipients. At computer 120, the address of each recipient of the e-mail is examined to determine if a rule exists that includes the recipient address. If a rule does not exist that includes the recipient address, a forwarding rule is created. If a blocking rule exists that includes the recipient address, the blocking rule is deleted and a forwarding rule including the recipient address is created. Deletion of the blocking rule and creation of a forwarding rule can be automatic. In an alternative embodiment, a user of computing device 110 is given an option to permanently delete or temporarily disable the blocking rule including the recipient address.

Figure 2:
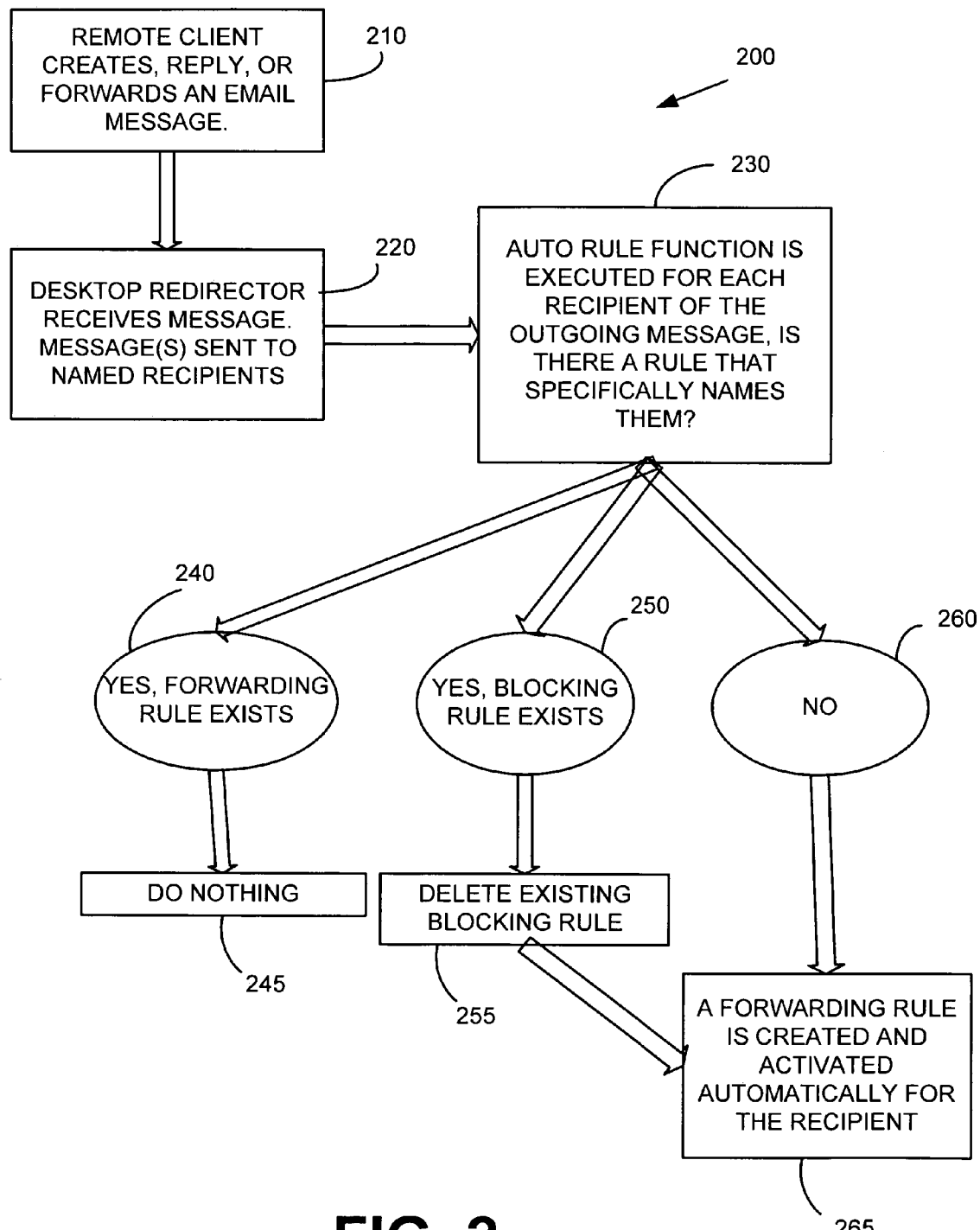
FIG. 2 is a flow diagram illustrating a method of automatically creating electronic mail forwarding rules in accordance with an exemplary embodiment.

FIG. 2 illustrates a flow diagram 200 depicting exemplary steps in a method of automatically creating electronic mail forwarding rules. Flow diagram 200 illustrates by way of example some steps that may be performed. Additional steps, fewer steps, or combinations of steps may be utilized in various different embodiments.

In a step 210, a remote client creates, replies, or forwards an e-mail message. The remote client can be a wireless application protocol (WAP) phone, a handheld computing device, a personal digital assistant (PDA) (e.g., a COMPAQ iPAQ PDA sold by Compaq Computers, Corp. of Houston, Tex., or a PALM PILOT PDA sold by Palm, Inc. of Santa Clara, Calif.), or any other computing device. The remote client can create, reply, or forward an e-mail using any of a variety of different commercially available e-mail programs. In an exemplary embodiment, the remote device uses the SYMMETRY PRO software program sold by INFOWAVE SOFTWARE of Burnaby, British Columbia, Canada.

In a step 220, a redirector program receives the e-mail message and the redirector communicates the e-mail to a named recipient or recipients. The desktop redirector can be a computer program or instructions included in a computing device. Further, the redirector can also be programmed instructions stored on a computer server managing e-mail accounts.

In a step 230, an automatic rule function is performed in which, for each recipient of an outgoing e-mail message, a check is made to determine whether a rule exists that specifically identifies the recipient. These rules can be forwarding rules or blocking rules. Forwarding rules establish e-mail addresses that a user wants to have forwarded to the remote device. Blocking rules establish e-mail addresses that the user does not want to have forwarded to the remote device.

In a step 240, it is determined that a forwarding rule exists for the recipient and, in a step 245, nothing is done because there is no need to establish a forwarding rule for the recipient. In a step 250, it is determined that a blocking rule exists for the recipient and, in a step 255, the existing blocking rule is deleted. After step 255, a step 265 is performed in which a forwarding rule for the recipient is created and activated automatically for the recipient.

In a step 260, it is determined that no rule exists for the recipient and step 265 is performed in which a forwarding rule for the recipient is created and activated automatically for the recipient. Alternatively, creation and activation of a forwarding rule can be an option activated by the user at the remote device.

Figure 3:
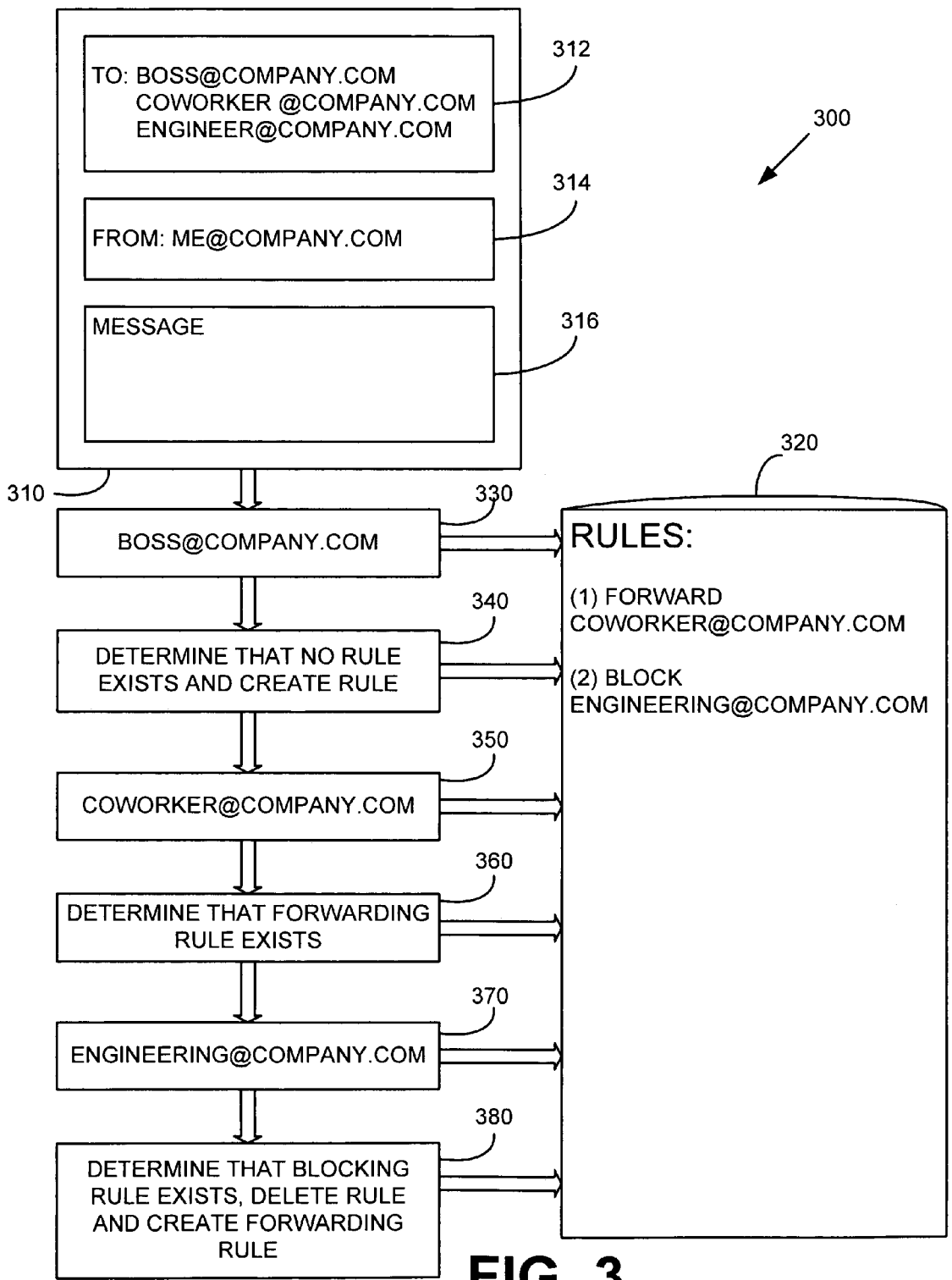
FIG. 3 is a diagram illustrating a process of e-mail forwarding rule creation in accordance with another exemplary embodiment.

FIG. 3 illustrates a diagram 300 depicting a process of e-mail forwarding rule creation. An e-mail 310 includes a "to" field 312 having one or more e-mail addresses, a "from" field 314 having one or more e-mail addresses, a message field 316 having text and/or an attached file or files. By way of example, "to" filed 312 includes the following e-mail addresses: "boss@company.com," "coworker@company.com," and "engineering@company.com." In "from" field 314, the following addresses can be included: "me@company.com." Message field 316 can include a text message intended to be sent from the person addressed in "from" field 314 to addressees in "to" field 312.

In a step 330, an e-mail addressee included in "to" field 312, such as, "boss@company.com" is checked against rules 320. No rules in rules 320 include "boss@company.com," therefore, in a step 340, a rule is created for forwarding messages received from "boss@company.com."

In the situation in which additional e-mail addressees are included in "to" field 312, such as, "coworker@company.com," the e-mail address is checked against rules 320 in a step 350. In a step 360, it is determined that a rule exists in rules 320 that e-mails received from "coworker@company.com" are forwarded to a remote device. Once a forwarding rule is found, there is no need to create a new forwarding rule.

In the situation in which additional e-mail addresses are included in "to" field 312, such as, "engineering@company.com," the e-mail is checked against rules 320 in a step 370. In a step 380, it is determined that a blocking rule exists for "engineering@company.com." The blocking rule is deleted and a forwarding rule is created for "engineering@company.com." The newly created forwarding rule can be stored in rules 320.

In at least one alternative embodiment, newly created forwarding rules apply only to replies to the electronic message sent to the recipient. Further, newly created forwarding rules can have time periods limiting their existence, after which previous rules are applied. Other variations can also be applied.

Advantageously, the systems and methods described in the FIGURES provide an automatic e-mail forwarding rule creation feature. In e-mail forwarding and redirection systems, such systems and methods ensure that the user receives subsequent replies from any person or group they send a message to, even if the person or group recipients have not been previously named in a forwarding rule or are currently named in a blocking rule.

Further, the systems and methods described with reference to the FIGURES can be used to check the named recipient of an e-mail message against an entire forwarding and blocking rule set, even rules that apply only to groups or domains. In such an embodiment, a forwarding rule can be added if a recipient is not part of a named group or domain in an existing forwarding rule.

Advantageously, the systems and methods described with reference to the FIGURES can ensure that a user always receives replies from people the user sends e-mail messages to, even if the user is employing forwarding or blocking rules that may or may not name the recipient. It is not necessary for a user to manually check to see if a forwarding rule exists for a recipient to ensure that subsequent replies from the recipient are received.

In at least one exemplary embodiment, the process illustrated by the systems and methods described with reference to the FIGURES does not require that an initial e-mail message be forwarded to the remote device and subsequently replied to from the remote device. The process can be applied to an e-mail message originating from a remote device.

While the embodiments illustrated in the FIGURES and described above are presently preferred, it should be understood that these embodiments are offered by way of example only. Other embodiments may include additional procedures or steps not described here. As mentioned previously, other embodiments may include application of forwarding or blocking rules to voice messages or phone calls. The invention is not limited to a particular embodiment, but extends to various modifications, combinations, and permutations that nevertheless fall within the scope and spirit of the appended claims.

What is claimed is:

1. A method of automatically creating message forwarding rules, the method comprising:
   receiving a message having at least one recipient; and
   for each of the at least one recipient:
      determining whether a rule exists including the recipient;
      if a blocking rule exists for the recipient, deleting the blocking rule and creating an active forwarding rule for the recipient; and
      if no rule exists for the recipient, creating an active forwarding rule for the recipient.

2. The method of claim 1, wherein receiving a message includes receiving the message from a remote client.

3. The method of claim 2, wherein the remote client is associated with a computer having programmed instructions for redirecting electronic mail.

4. The method of claim 3, wherein the programmed instructions for redirecting electronic mail include instructions for receiving electronic mail from a sender and redirecting the electronic mail to the remote client.

5. The method of claim 4, wherein the programmed instructions for redirecting electronic mail only redirects electronic mail from the sender if the sender has an address with a corresponding forwarding rule in the computer.

6. The method of claim 1, wherein the blocking rule includes at least one address corresponding to a sender selectively chosen as a sender address from which electronic mail is not to be redirected from a computer to a remote client.

7. The method of claim 1, wherein the active forwarding rule includes at least one electronic mail address corresponding to a sender address selectively chosen as a sender address from which electronic mail is redirected from a computer to a remote client.

8. The method of claim 1, wherein the at least one recipient includes a recipient address from an electronic mail message to field, cc field, or bcc field.

9. The method of claim 1, wherein the at least one recipient includes a grouping of electronic mail addresses.

10. The method of claim 1, further comprising communicating electronic mail messages between a computer and a client.

11. A system for automatically creating electronic mail forwarding rules for an electronic mail redirection program based on recipient addresses in electronic mail messages sent from a client device to a redirector, the system comprising:
- a central processing unit (CPU);
- a storage device coupled to the CPU and having stored there information for configuring the CPU to:
  - receive an electronic message from the client device, the electronic message having at least one recipient address; and
  - for each of the at least one recipient address:
    - determine whether a rule exists including the recipient address;
    - if a rule exists for the recipient address and the rule is a blocking rule, delete the blocking rule and create a forwarding rule for the recipient address; and
    - if no rule exists for the recipient address, create a forwarding rule for the recipient address.

12. The system of claim 11, wherein the CPU determines whether a rule exists including the recipient address by comparing stored electronic mail addresses with the recipient address.

13. The system of claim 11, wherein the at least one recipient address includes a group, the group being associated with a plurality of electronic mail addresses.

14. The system of claim 11, wherein the rule includes a domain name.

15. A system for automatically creating electronic mail forwarding rules, the system comprising:
- means for receiving an electronic mail message having at least one recipient;
- means for determining whether a rule exists including the recipient for each of the at least one recipient;
- means for deleting a blocking rule and creating an active forwarding rule for the recipient if a blocking rule exists for the recipient; and
- means for creating an active forwarding rule for the recipient if no rule exists for the recipient.

16. The system of claim 15, wherein means for receiving an electronic mail message receives the electronic mail message from a remote client.

17. The system of claim 16, wherein the remote client is associated with a computer having programmed instructions for redirecting electronic mail.

18. The system of claim 17, wherein the programmed instructions for redirecting electronic mail include instructions for receiving electronic mail from a sender and redirecting the electronic mail to the remote client.

19. The system of claim 18, wherein the programmed instructions for redirecting electronic mail only redirects electronic mail from the sender if the sender has an address with a corresponding forwarding rule in the computer.

20. The system of claim 15, wherein the at least one recipient includes an electronic mail address that communicates the electronic message to a number of electronic mail addresses.

* * * * *